United States Patent Office

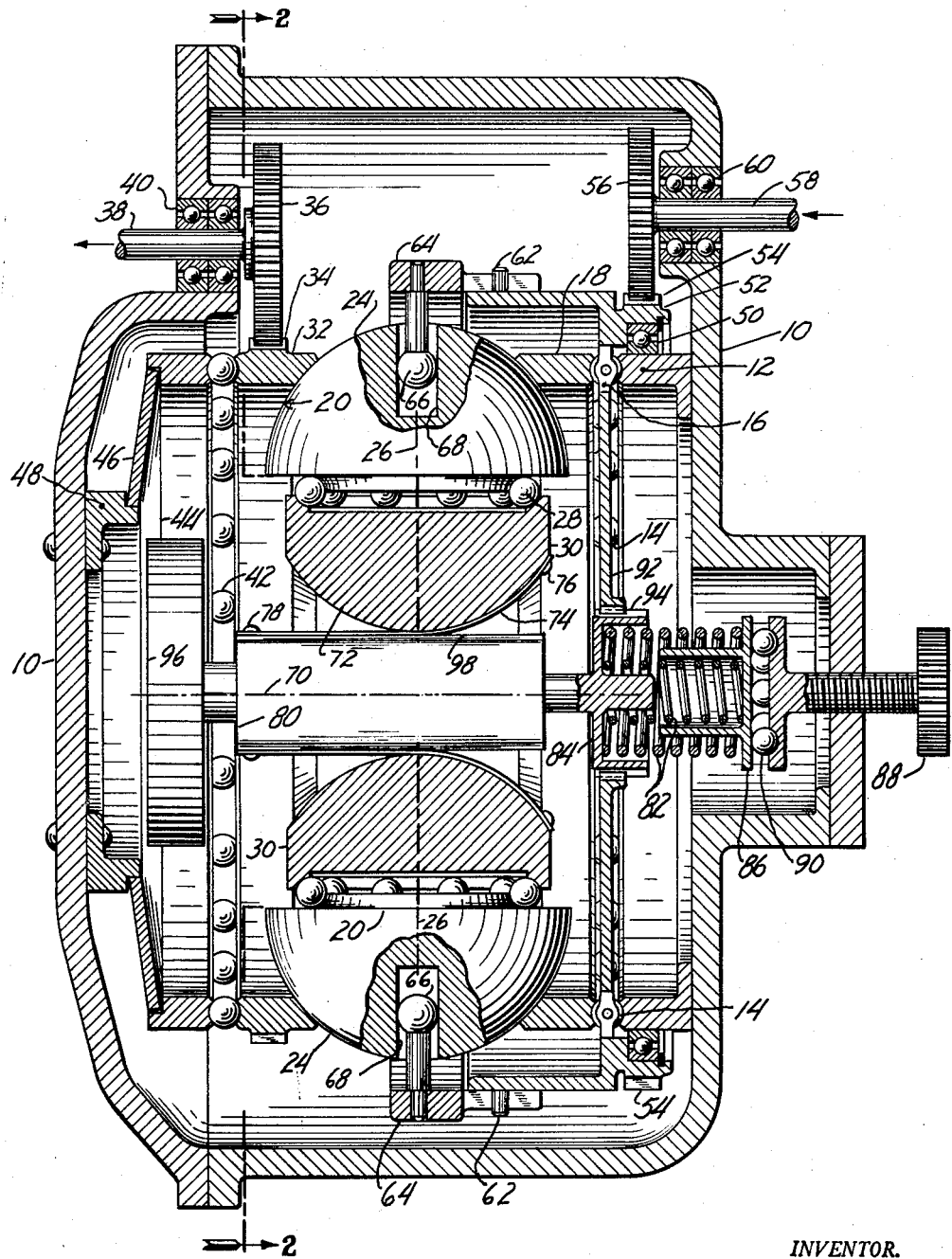

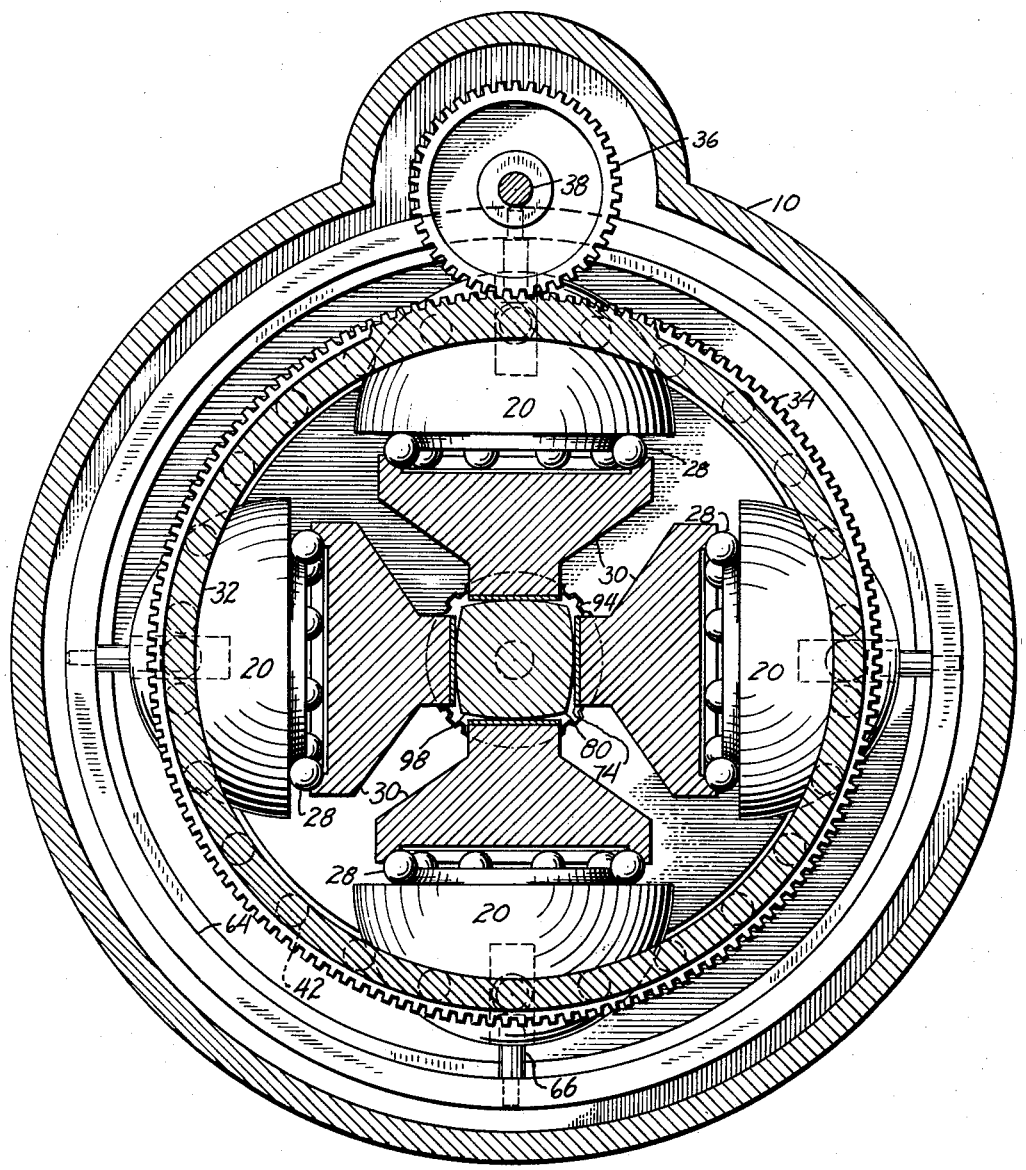

2,920,505
Patented Jan. 12, 1960

2,920,505

GOVERNOR RESPONSIVE TO GYROSCOPIC FORCES

Edward K. Hine, North Caldwell, N.J., assignor to Curtiss-Wright Corporation, a corporation of Delaware Application April 11, 1957, Serial No. 652,211

15 Claims. (Cl. 74—752)

This invention relates to governors for rotating machinery and provides a self-contained speed governing mechanism whose output yields sufficient torque to operate speed controlling mechanisms without the requirement for separate force boosting servo mechanisms.

In the conventional fly-ball type of governor, the output force of the governor is of rather low value if the governor is to have a high degree of sensitivity. Accordingly, the small governor output force must be amplified to produce an output speed correcting signal which can be applied to the speed correcting mechanism of a prime mover or other machinery to be controlled. Such force amplification requires the use of separate mechanisms and, if acceleration stabilization is to be incorporated in the governor system, still further additional equipment is required, all of which adds weight, complexity and cost to the system.

In the present invention, in a single unit mechanism, I provide a sensitive speed governor with integral arrangements for developing acceleration response and for developing a relatively high output force. The output force, then, can be used directly without further amplification to control the speed regulator of the basic machinery.

In general, this invention utilizes changes in gyroscopic force of a rotating planetary system to change the ratio of a continuously variable speed changer. The governor is driven from the basic machinery and calculates the speed error from a desired speed, regulating the ratio of a speed changer in the governor which has a high force output element whose movements are in accordance with the speed error. An acceleration responsive device may be made an integral part of the governor which further modifies the ratio of the speed changer to incorporate acceleration response in the governor output.

A better understanding of the specific nature of the invention may be secured by reading the following detailed description in connection with the attached drawings in which similar reference characters designate similar parts and in which:

Fig. 1 is a longitudinal section through an embodiment of my novel governor and

Fig. 2 is a section on the line 2—2 of Fig. 1.

The governor of the invention comprises a housing 10 to the right-hand wall of which, as shown, is secured an annular ball race 12. Running on this race is a series of balls 14 spaced by a retainer 16. Running on the balls 14 is another rotatable annular race 18, the left-hand end of which engages a plurality of rotating members 20. These members have spherically formed outer surfaces as at 24 and are constrained to rotate about their own axes 26 through the use of an anti-friction bearing 28 cooperating with rockable members 30.

On the opposite side of the members 20 from the race 18 is an output race 32 of annular form. This race has the same diameter as the race 18 and bears on the members 20 in precise opposition to the bearing of the race 18 on the members 20. The race 32 carries gear teeth 34 which engage a pinion 36 whose shaft 38 is supported in the housing 10 by bearings 40 and which shaft comprises the output member of the system. The race 32 is formed at its leftward end as a bearing race engaged by balls 42 which, in turn, engage a reaction race 44 spring pressed in a rightward direction by a conical spring washer 46 reacting against the housing 10 through a fixed locating ring 48. The pressure exerted by the spring 46 loads the races 32 and 18 into frictional engagement with the spherical surfaces 24 of the members 20.

A ball bearing 50 is mounted on the race 12 and pilots an input annulus 52 provided with gear teeth 54 and driven by an input pinion 56 having a shaft 58 carried in bearings 60 in the housing. The shaft 58, and consequently the annulus 52, is driven by the basic rotating machinery at a speed proportional thereto. The annulus 52 carries pins or splines 62 which drives an axially movable ring 64 having a spider element 66 extending inwardly therefrom for engagement with walls of spherical bores 68 formed in the members 20. These bores are co-axial with the axes 26. The spider element 66 engages the walls of the bores 68 in linear alignment with the annular races 18 and 32. Through the mechanism described, the annulus 52 drives the members 20 bodily around the main axis 70 of the governor. The annulus 52 carries the retainer 16 for the balls 14 and serves to drive these balls in their annular track bodily at the same speed around axis 70 as the members 20. Since the annular race 12 is non-rotating, the balls 14 spin thereagainst and drive race 18 at double the speed of the annulus 52.

With the members 20 being driven bodily on their axes at a speed N and the right-hand surfaces of the members 20 being driven at a speed 2N by the annular race 18 to spin the members 20 on their axes 26, the points on the members 20 which engage the annular race 32 have zero absolute speed so long as the axes 26 are normal to the main axis 70. This results in zero rotation of race 32. If the axes 26, however, are tilted in one direction or the other in the plane of the drawings, the annular race 32 will be driven in one direction or the other about the axis 70 by the spinning members 20 due to the difference in radius from the member axes 26 to the respective points of contact of the member surfaces 24 with the annular races 18 and 32.

The assembly described comprises an infinitely variable speed changer driven by the basic machinery and providing power output at the annular race 32 accordingly as the axes 26 of the members 20 are tilted. The race 32, then, along with the output shaft 38, provides a power output from the governor to drive a suitable speed adjusting mechanism for the basic machinery.

The rockable members 30, in addition to races for the bearings 28, are provided with rocking surfaces 72 in the plane of the axis 70 and struck from the same center on the member axes 26 from which the spherical surfaces 24 are struck. Each rocking surface 72 is provided with a spring-like strap 74 secured at one end as at 78 to a core element 80. This core element, as shown in Fig. 2, has as many sides as there are members 20 and rockers 30. It provides a reaction element to hold the members 20 and 30 in the position which they require for proper alignment and cooperation with the annular races 18 and 32. This positioning of the members 20 enables the necessary force to be exerted thereon by the spring 46 through the races 18 and 32 to enable a powerful friction drive from the power input 58 to the governor output 38.

It will be appreciated that the members 20, which have considerable mass, rotate individually about the axes 26 and rotate bodily about the governor axis 70, The combined rotation of the members 20 in the proper directions creates gyroscopic precessional forces which urge the axes 26 to tilt, the gyroscopic tilting force being proportional to a function of the rotational speeds of the system. Thus, the tilting force, above mentioned, being proportional to a function of the system speeds, is a measure of the speed of the system. In the embodiment shown, rotation directions are established so that the gyroscopic force tends to tilt axes 26 to urge core element 80 rightwardly.

The core element 80 is mounted for axial movement as well as for rotation with the system, but is restrained from rightward movement by a system of springs 82 confined between a cup 84 secured to the core element 80 and a normally fixed axially adjustable cup 86. The position of the cup 86 is adjustable axially by an adjuster 88 secured in the housing 10 acting through a thrust bearing 90. The compression of the springs 82 may be regulated by the adjuster 88 to counteract exactly the gyroscopic force at some certain system speed when the members axes 26 are normal to the system axis 70.

If the system speed increases over the set speed equivalent to the spring setting, the members 20 and 30 will tilt, further compressing the springs 82. If the system speed drops below the speed set by the springs 82, the members 20 and 30 will tilt to relax pressure on the springs 82. As implied previously, the tilt of axes 26 in one direction will produce rotation of the output race 32 in one direction while tilt of axes 26 in the other direction will produce a rotation of the race 32 in the opposite direction. Any rotation of the annular race 32 implies a speed error from set speed of the rotating system so that this rotation of the race 32 will be utilized to adjust the speed regulator for the basic machinery.

The core element 80 is driven with the spider elements 66 through the engagement of inward projections 92 of the retainer 16 with axially movable driving splines 94 formed on the exterior of the spring cup 84.

If the planetary axes 26 are tilted in the direction of rotation so that they do not intersect the main axis 70, the member surfaces 24 will not roll truly on the races 18 and 32. Rather, they will be tilted at a slight angle, tending to climb or descend on the races. Since they are constrained to a fixed path of travel, there will be creep at the contacts of the member surfaces 24 with the races 18 and 32, introducing a tangential drag force along the surfaces 24 urging the members 20 to tilt in the plane of the drawings in Fig. 1. Thus, the creep force tends to introduce a ratio change in the speed changer, which is resisted by the speeder springs 82. The tendency toward ratio change persists until axes 26 are realigned to intersect axis 70. Shift of axes 26 from intersection with axis 70 is normally undesirable, but if it is introduced in a controlled manner, can be used to improve the performance of the governor. In the invention as shown, I provide a flywheel 96 mounted on the end of the core 80 which causes the core 80 to lead or lag rotation of the members 20 during deceleration or acceleration which, in conjunction with slightly convex surfaces 98 on the core, enables the axes 26 to tilt a minute amount to introduce the aforesaid creep into the rolling contacts. As shown, the convexity 98 is greatly exaggerated. The creep thus introduces a transient ratio change and an acceleration function speed error correction so long as the acceleration function persists. This ratio change is algebraically additive to any ratio change produced by speed error as such.

The amount of acceleration sensitivity introduced into the system is principally controlled by the inertia of the flywheel and associated parts which rotate on the axis 70, along with the freedom which is allowed by the convex surfaces 98 of the core, and the stiffness of the speeder springs 82. This sensitivity is calculable, and can be controlled by appropriate analysis and careful design.

From the foregoing, it will be seen that I have provided a sensitive governor which will produce powerful output motion in response to system speed error plus or minus rate of change of speed error. The mechanism depicted in the drawings is, at this time, the preferred arrangement, but it should be clear to designers and mechanicians that changes and modifications may be made.

The scope of the invention should not be considered as limited to the particular driven arrangements, parts or other details presently shown. Rather, the scope of the invention should be construed from the following claims.

I claim:

1. A speed governor for rotating machinery comprising facing coaxial annular races, one comprising a rotatable output race and the other a rotatable input race, a tiltable member between and having spherical segmental surfaces engaged with said races, the center of said segmental surfaces of said tiltable member being spaced from the axis of said races, bearing means engaging said tiltable member locating the latter for spinning about an axis of its own which is generally radial relative to the axis of said races, means substantially coaxial with and translatable along said race axis and coupled to said bearing means to control the tilt of said bearing means and tiltable members, resilient means urging said coaxial means in one direction against the gyroscopic force induced by said tiltable member during its rotation, and means to drive said tiltable member about the race axis and to drive said input race member.

2. A speed governor for rotating machinery comprising facing coaxial annular races, one comprising a rotatable output race and the other a rotatable input race, a tiltable member between and having spherical segmental surfaces engaged with said races, the center of said segmental surfaces of said tiltable member being spaced from the axis of said races, bearing means engaging said tiltable member locating the latter for spinning about an axis of its own which is generally radial relative to the axis of said races, means substantially coaxial with and translatable along said race axis and coupled to said bearing means to control the tilt of said bearing means and tiltable members, resilient means urging said coaxial means in one direction against the gyroscopic force induced by said tiltable member during its rotation and, means to drive said tiltable member about the race axis and to drive said input race member, said latter driving means being arranged to drive said input race member at twice the bodily rotational speed of said tiltable member.

3. A speed governor for rotating machinery comprising facing annular races, one comprising a rotatable but normally stationary output race and the other a rotatable input race, means to drive said input race at a speed of 2N where N is a speed proportional to that of the machinery, a plurality of tiltable members having spherically formed portions engaging said races, tiltable spider elements on which said members are rotatably mounted for rotation on their own axes, said spider elements and members being rotatable bodily about the axis of said races, and means to drive said members bodily at N rotational speed.

4. A speed governor for rotating machinery comprising facing annular races, one comprising a rotatable but normally stationary output race and the other a rotatable input race, means to drive said input race at a speed of 2N where N is a speed proportional to that of the machinery, a plurality of tiltable members having spherically formed portions engaging said races, tiltable spider elements on which said members are rotatably mounted for rotation on their own axes, said spider elements and members being rotatable bodily about the axis of said races, and means to drive said members bodily at N rotational speed.

5. A speed governor for rotating machinery comprising facing annular coaxial races, means extending coaxially with said races and disposed therewithin, said means being axially movable gyro members mounted for spinning on said coaxial means on axes normally substantially radial thereto, the spin axes of said gyro members being tiltable in the plane of the axis of said races, means to drive said gyro members bodily about said race axis, said gyro members having spherically segmental surfaces thereon engaged with said annular races, means to drive one of said races at a speed greater than that of the bodily rotating gyro members whereby to spin said gyro members on their tiltable axes, said other annular race thereby being driven at a speed depending on the tilt of said spin axes.

6. A speed governor for rotating machinery comprising facing annular coaxial races, means extending coaxially with said races and disposed therewithin, said means being axially movable gyro members mounted for spinning on said coaxial means on axes normally substantially radial thereto, the spin axes of said gyro members being tiltable in the plane of the axis of said races, means to drive said gyro members bodily about said race axis, said gyro members having spherically segmental surfaces thereon engaged with said annular races, means to drive one of said races at a speed greater than that of the bodily rotating gyro members whereby to spin said gyro members on their tiltable axes, said other annular race thereby being driven at a speed depending on the tilt of said spin axes, the combined bodily rotation and spinning rotation of said gyro members inducing gyroscopic forces tending to tilt said tiltable axes in one direction, and means acting on said coaxial means to resist said gyroscopically urged tilt.

7. A speed governor for rotating machinery comprising facing annular coaxial races, means extending coaxially with said races and disposed therewithin, said means being axially movable gyro members mounted for spinning on said coaxial means on axes normally substantially radial thereto, the spin axes of said gyro members being tiltable in the plane of the axis of said races, means to drive said gyro members bodily about said race axis, said gyro members having spherically segmental surfaces thereon engaged with said annular races, means to drive one of said races at a speed greater than that of the bodily rotating gyro members whereby to spin said gyro members on their tiltable axes, said other annular race thereby being driven at a speed depending on the tilt of said spin axes, said other race being connected to operate a speed adjuster for said rotating machinery and said one race and said gyro members being driven by said rotating machinery.

8. A governor according to claim 5 including means to preload said races and spherically segmental surfaces of said gyro members into driving engagement with one another.

9. A governor according to claim 5 wherein said means to drive said gyro members bodily engages them at radii from the axis of said annular races which are substantially the same as the radii of said annular races.

10. A governor comprising members mounted planetarily for bodily rotation and for individual rotation on their own axes, said axes being tiltable and said members tending to tilt in one direction through gyroscopic action during their rotation, driving means connected to said members to rotate them bodily and on their own axes, means directly acting on said members to resiliently urge the members to a particular position at a predetermined speed of said driving means and permitting tilting from such position only at speeds differing from the predetermined speed and means driven by said members at a rate dependent on the tilt thereof.

11. A governor comprising a central rotor, members mounted for bodily rotation thereon, for individual rotation on their own axes and for tilt of their own axes relative to the axis of said central rotor, means to drive said members bodily and individually for said rotation on their own axes, means directly acting on said members to resiliently urge the members to a particular position at a predetermined speed of said driving means and permitting tilting from such position only at speeds differing from the predetermined speed and means driven by said members at a speed established by the tilt of said members.

12. A governor comprising an axially movable central rotor, members mounted thereon for bodily rotation and for rotation on their own axes, each said own axis being in a plane common with the axis of said rotor, means mounting said members for tilt of their axes, axis tilting being urged by the gyroscopic forces created by said rotations, means to drive said members for said bodily rotation and rotation on their own axes, means directly acting on said members to resiliently urge the members to a particular position at a predetermined speed of said driving means and permitting tilting from such position only at speeds differing from the predetermined speed and a power takeoff from said members rotatable in accordance with the tilt thereof.

13. A governor according to claim 12 wherein said members include spherical segmental surfaces, and wherein said power takeoff comprises an annular race frictionally engaging said spherical segmental surfaces.

14. A governor according to claim 13 wherein said means to drive includes a driving spider for each member engaging the member at a radius thereon which is substantially the same as the radius of said race.

15. A governor according to claim 14 wherein said means to drive further includes an annular race rotated at twice spider speed frictionally engaged with the spherical segmental surfaces of said members at points thereon opposite from the points engaged by said power take-off race.

References Cited in the file of this patent
UNITED STATES PATENTS

| | | |
|---|---|---|
| 2,101,844 | Fraser | Dec. 14, 1937 |
| 2,108,082 | Sharpe | Feb. 15, 1938 |